United States Patent
Mae et al.

(10) Patent No.: US 7,957,625 B2
(45) Date of Patent: Jun. 7, 2011

(54) IMAGE RECORDING APPARATUS AND METHOD, AND PROGRAM FOR SELECTING A RECORDING MODE INDEPENDENT FROM THE RECORDING ASPECT RATIO

(75) Inventors: Atsushi Mae, Tokyo (JP); Kenichiro Aridome, Kanagawa (JP)

(73) Assignee: Sony Corporation, Tokyo (JP)

( * ) Notice: Subject to any disclaimer, the term of this patent is extended or adjusted under 35 U.S.C. 154(b) by 944 days.

(21) Appl. No.: 10/588,034

(22) PCT Filed: Sep. 14, 2005

(86) PCT No.: PCT/JP2005/016925
§ 371 (c)(1),
(2), (4) Date: Aug. 1, 2006

(87) PCT Pub. No.: WO2006/061935
PCT Pub. Date: Jun. 15, 2006

(65) Prior Publication Data
US 2009/0041429 A1    Feb. 12, 2009

(30) Foreign Application Priority Data
Dec. 10, 2004 (JP) ............... P2004-357684

(51) Int. Cl.
*H04N 5/92* (2006.01)
(52) U.S. Cl. .................. 386/326; 386/335
(58) Field of Classification Search ........... 386/131, 386/46, 109, 111, 326, 335; 375/240, 240.02, 375/240.12; 348/445, 556
See application file for complete search history.

(56) References Cited

U.S. PATENT DOCUMENTS

| | | | | |
|---|---|---|---|---|
| 5,999,220 A | * | 12/1999 | Washino | 348/441 |
| 6,788,382 B2 | * | 9/2004 | Mori et al. | 352/244 |
| 7,375,768 B2 | * | 5/2008 | Herberger et al. | 348/584 |
| 2004/0126098 A1 | * | 7/2004 | Kim et al. | 386/117 |
| 2005/0123284 A1 | * | 6/2005 | Kikuchi et al. | 386/125 |

FOREIGN PATENT DOCUMENTS

| | | |
|---|---|---|
| JP | 11-331777 | 11/1999 |
| JP | 2001-136487 | 5/2001 |
| JP | 2004-201170 | 7/2004 |

* cited by examiner

*Primary Examiner* — David E Harvey
(74) *Attorney, Agent, or Firm* — Finnegan, Henderson, Farabow, Garrett & Dunner, L.L.P.

(57) ABSTRACT

The present invention relates to an image recording apparatus and method, and a program for improving usability by removing operational constraints on combinations of an aspect ratio of a recorded moving image and a horizontal resolution from users while the compliance with the DVD-Video standard is strictly maintained. When an aspect ratio is 16:9 in a state that an LP mode is selected, a horizontal×vertical resolution is set to 720×480. When the aspect ratio is 4:3 in a state that the LP mode is selected, the horizontal×vertical resolution is set to 352×480. When an HQ or SQ mode is selected, the horizontal×vertical resolution is set to 720×480 irrespective of the aspect ratio. Accordingly, the image recording apparatus can encode a moving image and record the encoded image onto a DVD 17 without violating the DVD-Video standard while allowing users to arbitrarily select a recording mode and an aspect ratio. The present invention can be applied to video cameras, video recorders, etc.

6 Claims, 6 Drawing Sheets

FIG. 1

| TV SYSTEM | NTSC SCANNING LINE 525 60 FIELDS/S | PAL SCANNING LINE 625 50 FIELDS/S |
|---|---|---|
| ACCEPTED RESOLUTION FOR MOVING IMAGE HORIZONTAL × VERTICAL | 720 × 480 | 720 × 576 |
| | 704 × 480 | 704 × 576 |
| | 352 × 480 (UNACCEPTABLE FOR ASPECT RATIO OF 16:9) | 352 × 576 (UNACCEPTABLE FOR ASPECT RATIO OF 16:9) |
| | 352 × 240 (UNACCEPTABLE FOR ASPECT RATIO OF 16:9) | 352 × 288 (UNACCEPTABLE FOR ASPECT RATIO OF 16:9) |

FIG. 2

| RECORDING MODE \ ASPECT RATIO | 16 : 9 | 4 : 3 |
|---|---|---|
| HQ MODE (720 × 480) | ○ | ○ |
| SQ MODE (720 × 480) | ○ | ○ |
| LP MODE (352 × 480) | × | ○ |

FIG. 7

| ASPECT RATIO / RECORDING MODE | 16:9 | 4:3 |
|---|---|---|
| HQ MODE | ◯ (720 × 480) | ◯ (720 × 480) |
| SQ MODE | ◯ (720 × 480) | ◯ (720 × 480) |
| LP MODE | ◯ (720 × 480) | ◯ (352 × 480) |

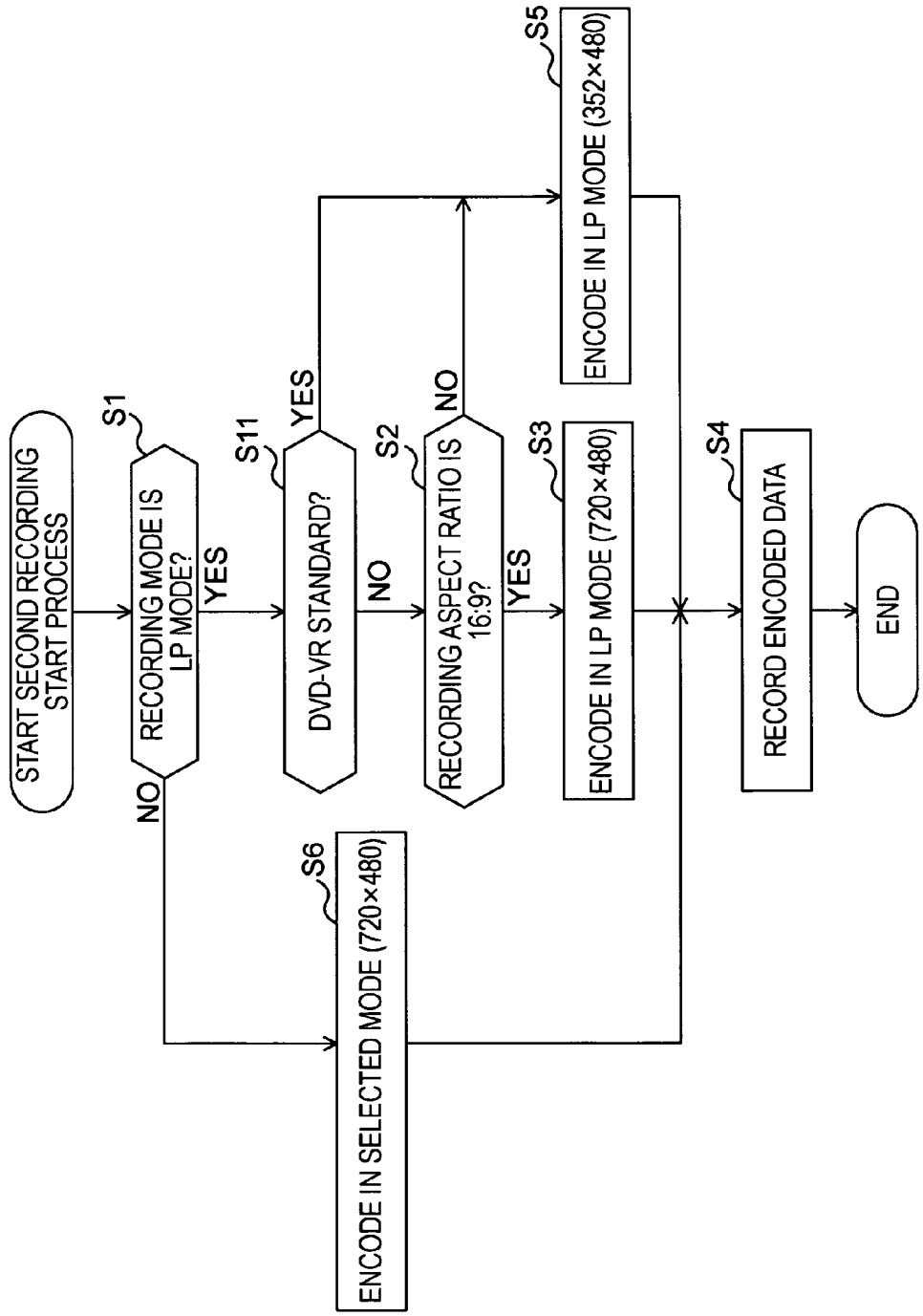

IMAGE RECORDING APPARATUS AND METHOD, AND PROGRAM FOR SELECTING A RECORDING MODE INDEPENDENT FROM THE RECORDING ASPECT RATIO

TECHNICAL FIELD

The present invention relates to image recording apparatuses and methods, and programs, and more particularly, to an image recording apparatus and method, and a program allowing users to arbitrarily select a recording mode concerned with a bit rate, a resolution, etc. irrespective of an aspect ratio of a recorded moving image.

BACKGROUND ART

The DVD-Video standard is one of the standards for encoding a moving image and recording the encoded moving image on a DVD (Digital Versatile Disc) and is widely adopted for commercial video cameras and video recorders (see, for example, Patent Document 1).

FIG. 1 is a diagram showing horizontal×vertical resolutions acceptable to MPEG (Moving Picture Experts Group) 2 video recorders that perform recording operations in compliance with the DVD-Video standard. In the NTSC (National Television System Committee) television system, four types of horizontal×vertical resolution such as 720×480, 704×480, 352×480, and 352×240 can be accepted. However, in a case where the aspect ratio of an encoded moving image is 16:9, the resolutions of 352×480 and 352×240 cannot be accepted. In the PAL television system, four types of horizontal×vertical resolution such as 720×576, 704×480, 352×576, and 352×288 can be accepted. However, in a case where the aspect ratio of an encoded moving image is 16:9, the resolutions of 352×576 and 352×288 cannot be accepted.

In other words, in the DVD-Video standard, in a case where the aspect ratio of a moving image recorded by an MPEG2 video recorder is 16:9, the value of a horizontal resolution selectable for an encoding operation performed on the moving image is limited to 704 or 720.

Accordingly, in known video cameras, video recorders, etc. strictly compliant with the DVD-Video standard, a combination of the aspect ratio of a recorded moving image and a recording mode concerned with a value of a horizontal resolution, etc. is controlled, for example, as shown in FIG. 2.

Referring to the example shown in FIG. 2, three types of recording mode are provided. An HQ mode has a resolution of 720×480, where the highest-quality encoding is performed. An SQ mode has a resolution of 720×480, where the second-highest-quality encoding is performed. An LP mode has a resolution of 352×480, where encoding enabling longer-time recording of a moving image on a recording medium with the same capacity as recording media used in other modes is performed. In this case, however, the quality of the recorded moving image becomes lower than that of the recorded moving image acquired when the HQ or SQ mode is used.

For example, when a user sets an aspect ratio of a moving image to be recorded to 4:3, or when an aspect ratio of a moving image having been input so as to be recorded is 4:3, any of the HQ, SQ, and LP modes can be selected.

However, when the user sets an aspect ratio of a moving image to be recorded to 16:9, or when an aspect ratio of a moving image having been input so as to be recorded is 16:9, the LP mode having a horizontal resolution of 352 cannot be selected.

In contrast, when the user selected the LP mode that has a horizontal resolution of 352, the user cannot set an aspect ratio of a moving image to be recorded to 16:9.

In a case where a bit rate is set to a low value so that a minimum recording length of a recording medium such as a DVD can be extended, the amount of information per pixel can be more increased by encoding a moving image that has an aspect ratio of 16:9 at a horizontal resolution of 352 rather than 704 or 720. Consequently, improvement in quality of the encoded moving image can be expected.

Therefore, there have been video cameras or the like that encode a moving image that has an aspect ratio of 16:9 at a horizontal resolution of 352 and record the encoded moving image in spite of adopting the DVD-Video standard.

In these video cameras, a moving image is recorded using a format not compliant with the DVD-Video standard, and information showing that the moving image has the aspect ratio of 4:3 is recorded at a predetermined position on the format.

[Patent Document 1] Japanese Unexamined Patent Application Publication No. 2004-201170

DISCLOSURE OF INVENTION

Problems to be Solved by the Invention

Like the case of the known video cameras, video recorders, etc. described above, if operational constraints such as a nonselective recording mode for a certain aspect ratio and, in contrast, a nonselective aspect ratio for a certain recording mode, exist in products, users receive a bad impression that the products are inconvenient since they do not know that these constraints are due to the standard.

Furthermore, in the case of a video camera, or the like, that encodes a moving image that has an aspect ratio of 16:9 at a horizontal resolution of 352 and records the encoded moving image, the DVD on which the moving image has been recorded using the video camera or the like may be played back only by the used video camera or the like. Thus, compatibility between recording media may not be established.

The present invention has been made in view of the above-described background, and it is an object of the present invention to improve usability by removing operational constraints on a combination of an aspect ratio of a moving image to be recorded and a horizontal resolution from users while the compliance with the DVD-Video standard is strictly maintained.

Means for Solving the Problems

An image recording apparatus according to the present invention includes the following elements: aspect ratio setting means for setting a first or second aspect ratio as an aspect ratio for encoding a moving image to be input, in accordance with an operation performed by a user; recording mode setting means for setting a recording mode for encoding the moving image in accordance with an operation performed by a user, the recording mode being concerned with a bit rate and a resolution; decision making means for setting a first or second resolution as a resolution for encoding the moving image in accordance with a combination of the aspect ratio and the recording mode, both of which having been set; and encoding means for encoding the moving image at the resolution having been set by the decision making means. The decision making means sets the first resolution as a resolution for encoding the moving image irrespective of the recording mode having been set in a case where the aspect ratio having been set is the first aspect ratio.

The decision making means can set a horizontal resolution of 720 or 704 for encoding the moving image irrespective of the recording mode having been set in a case where the aspect ratio having been set is 16:9.

The predetermined standard is determined on the basis of information on a recording medium on which the moving image having been encoded by the encoding means is recorded, and the decision making means can set the first or second resolution as a resolution for encoding the moving image corresponding to the recording mode having been set irrespective of the aspect ratio having been set in a case where the predetermined standard having been determined is the DVD-VR standard.

The image recording apparatus according to the present invention can further include detecting means for detecting an aspect ratio of a moving image having been input. The decision making means can set the first or second resolution as a resolution for encoding the moving image in accordance with a combination of the aspect ratio having been detected or set and the recording mode.

An image recording method according to the present invention includes the following steps: a decision making step of setting a first or second resolution as a resolution for encoding a moving image in accordance with a combination of an aspect ratio and a recording mode, both of which having been set; and an encoding step of encoding the moving image at the resolution having been set in the decision making step. In the decision making step, the first resolution is set as a resolution for encoding the moving image irrespective of the recording mode having been set in a case where the aspect ratio having been set is the first aspect ratio.

A program according to the present invention causes a computer to execute processing including the following steps: a decision making step of setting a first or second resolution as a resolution for encoding a moving image in accordance with a combination of an aspect ratio and a recording mode, both of which having been set; and an encoding step of encoding the moving image at the resolution having been set in the decision making step. In the decision making step, the first resolution is set as a resolution for encoding the moving image irrespective of the recording mode having been set in a case where the aspect ratio having been set is the first aspect ratio.

In the present invention, a first or second resolution is set as a resolution for encoding a moving image in accordance with a combination of an aspect ratio and a recording mode, both of which having been set, and the moving image is encoded at the resolution having been set. When the aspect ratio having been set is a first aspect ratio, the first resolution for encoding the moving image is set irrespective of the recording mode having been set.

Advantages

According to the present invention, usability can be improved by removing operational constraints on a combination of an aspect ratio of a moving image to be recorded and a horizontal resolution from users while the compliance with the DVD-Video standard is strictly maintained.

BRIEF DESCRIPTION OF THE DRAWINGS

FIG. 1 is a diagram showing horizontal×vertical resolutions acceptable in the DVD-Video standard.

FIG. 2 is a diagram showing combinations of an aspect ratio and a recording mode concerned with a value of a horizontal resolution, etc. for maintaining strict compliance with the DVD-Video standard.

FIG. 7 is a diagram showing combinations of an aspect ratio and a recording mode which are capable of being used by a moving image recording apparatus.

FIG. 8 is a flowchart showing a second recording start process.

Figure 3:
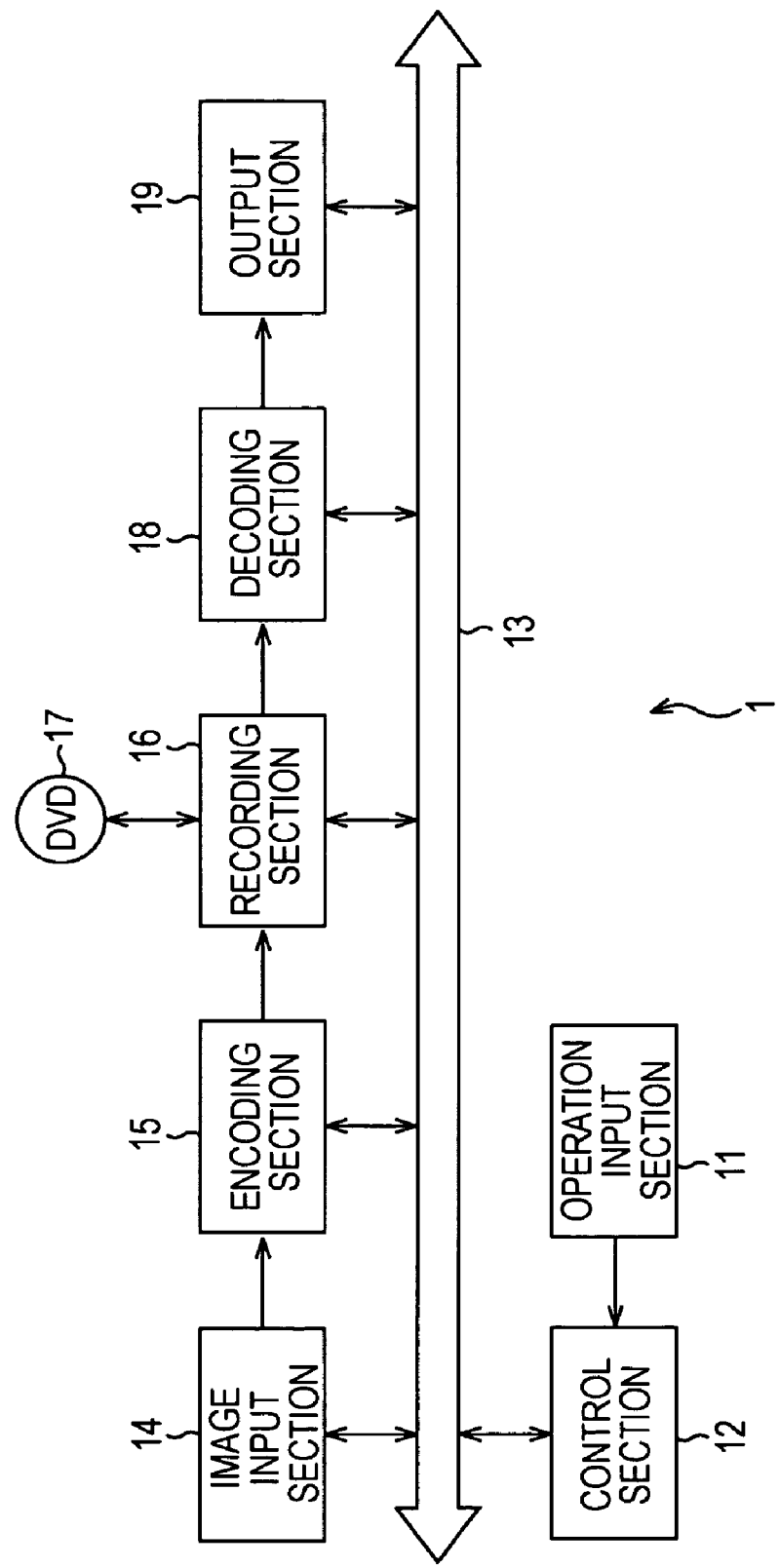
FIG. 3 is a block diagram showing an exemplary configuration of a moving image recording apparatus in which the present invention is applied.

REFERENCE NUMERALS 1 moving image recording apparatus, 11 operation input section, 12 control section, 13 control line, 14 image input section, 15 encoding section, 16 recording section, 17 DVD, 18 decoding section, 19 output section, 20 UI generating unit, 21 aspect ratio discriminating unit, 22 aspect ratio setting unit, 23 recording mode setting unit, 24 format setting unit, 25 determining unit, 26 horizontal resolution decision unit

BEST MODE FOR CARRYING OUT THE INVENTION

A specific embodiment in which the present invention is applied will now be described in detail with reference to the accompanying drawings.

FIG. 3 is a diagram showing an exemplary configuration of a moving image recording apparatus in which the present invention is applied. The moving image recording apparatus 1 encodes a moving image having been input and then records the encoded moving image onto a DVD 17. In addition, the moving image recording apparatus 1 reads and plays back encoded data having been recorded on the DVD 17 and then outputs a moving image acquired as a result of the playback operation to a television receiver, etc. at a subsequent stage.

The moving image recording apparatus 1 is provided with an operation input section 11, a control section 12, an image input section 14, an encoding section 15, a recording section 16, a decoding section 18, and an output section 19. The operation input section 11 receives a user's operation and outputs an operational signal corresponding to the user's operation to the control section 12. The control section 12 controls each section of the moving image recording apparatus 1 via a control line 13. The image input section 14 is a section to which an image signal supplied from an external apparatus (not shown) is input. The encoding section 15 encodes the image signal having been input. The recording section 16 records the encoded image signal (encoded data) onto the DVD 17 and reads the encoded data having been recorded on the DVD 17. The decoding section 18 decodes the encoded signal having been read from the DVD 17 into an image signal. The output section 19 outputs the decoded image signal to an external apparatus (not shown).

The operation input section 11 is configured by, for example, a remote controller or a push button disposed on the surface or the like of the moving image recording apparatus 1.

The external apparatus supplying an image signal to the image input section 14 may be, for example, a video camera capable of taking a moving image, a tuner for receiving television broadcasts, etc. The image signal supplied to the image input section 14 may have a fixed aspect ratio, or the aspect ratio of the image signal may be set in the moving image recording apparatus 1.

The encoding section 15 encodes the image signal having been input from the image input section 14 in compliance with the DVD-Video standard having been adopted or in compliance with either the DVD-Video or DVD-VR standard having been selectively adopted, and then outputs the encoded data acquired as a result of the encoding operation to the moving image recording apparatus 1.

The output section 19 outputs not only the image signal having been decoded by the decoding section 18 but also an image signal of a setting display 31 for various settings (FIG. 5) to a subsequent stage. The latter image signal is generated by the control section 12. The external apparatus to which the output section 19 outputs these image signals may be, for example, a television receiver.

Figure 4:
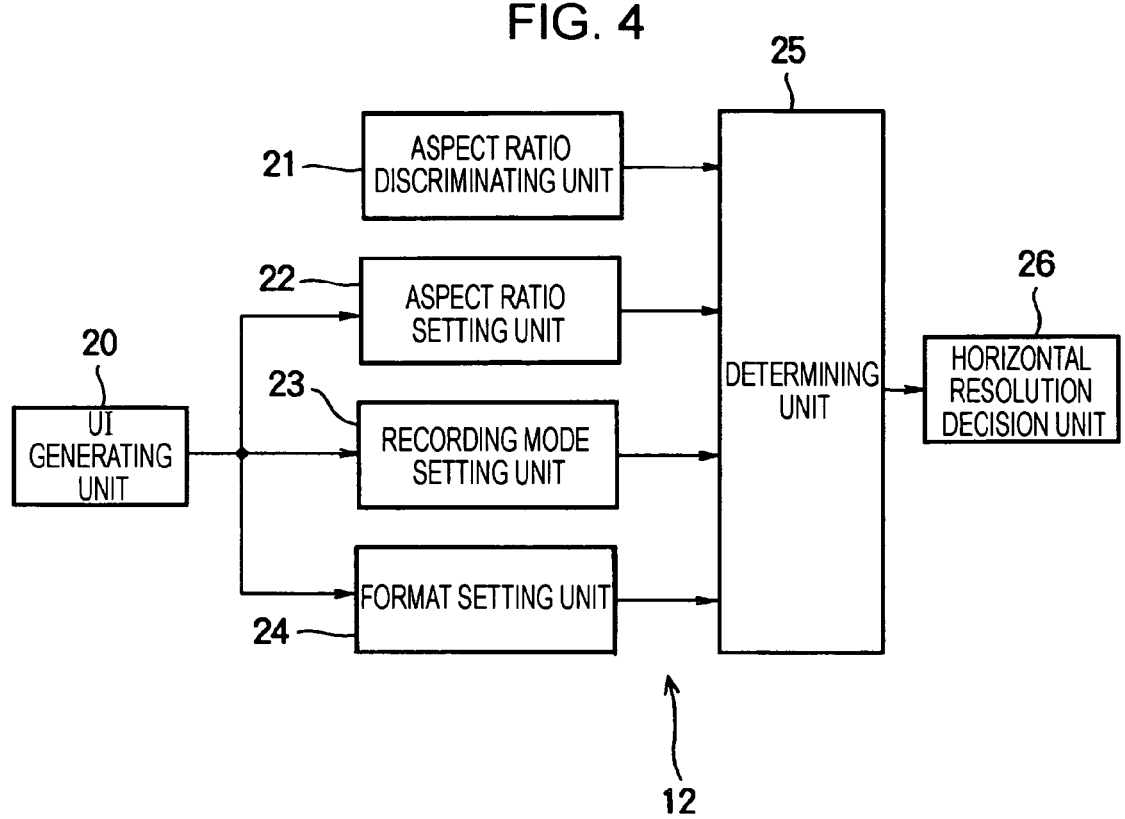
FIG. 4 is a block diagram showing an exemplary configuration of a control section shown in FIG. 3.

Next, FIG. 4 is an exemplary configuration of the control section 12. The control section 12 is provided with the following units: a UI generating unit 20 for generating display data of the setting display 31 enabling users to select a recording format, a recording mode, an aspect ratio, etc.; an aspect ratio discriminating unit 21 for discriminating an aspect ratio of the image signal having been supplied to the image input section 14; an aspect ratio setting unit 22 for setting an aspect ratio in accordance with a selection operation performed by a user by means of the setting display 31; a recording mode setting unit 23 for setting a recording mode in accordance with a selection operation performed by a user by means of the setting display 31; and a format setting unit 24 for setting a recording format in accordance with a selection operation performed by a user by means of the setting display 31.

In addition, the control section 12 is provided with the following units: a determining unit 25 for determining which recording mode and aspect ratio have been set, in accordance with the result of either discrimination by the aspect ratio discriminating unit 21 or setting by the aspect ratio setting unit 22, and the results of settings by the recording mode setting unit 23 and the format setting unit 24; and a horizontal resolution decision unit 26 for setting a horizontal resolution in accordance with the result of determination by the determining unit 25.

In the determining unit 25, in a case where the aspect ratios shown as the results of discrimination by the aspect ratio discriminating unit 21 and setting by the aspect ratio setting unit 22 differ from each other, a setting in which one of the aspect ratios is prioritized over the other one can be made.

The exemplary configuration shown in FIG. 4 may be implemented by hardware or software.

Figure 5:
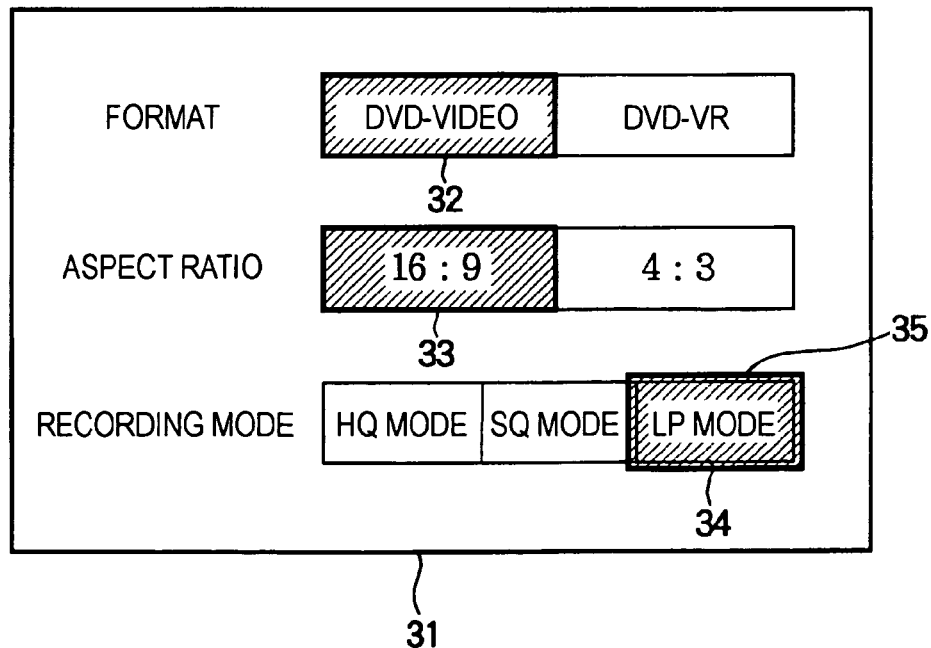
FIG. 5 is an example of a setting display for selecting a format, an aspect ratio, and a recording mode.

FIG. 5 is a diagram showing an example of the setting display 31 generated by the UI generating unit 20. Referring to the exemplary display shown in FIG. 5, the DVD-Video standard, an aspect ratio of 16:9, and an LP mode are selected as a recording format, an aspect ratio, and a recording mode, respectively.

A user can select a recording format out of the DVD-Video and DVD-VR standards, an aspect ratio out of the wide aspect ratio of 16:9 and a normal aspect ratio of 4:3, and a recording mode out of HQ, SQ, and LP modes by moving a cursor displayed on the setting display 31 using the operation input section 11. These selection operations have no operational constraints such as a non-selective combination of the aspect ratio of 16:9 and the LP mode. The recording format may be selected by the control section 12 on the basis of the information having been recorded on the DVD 17 in advance without being selected by a user using the setting display 31. The selection of the recording format by the control section 12 is more general.

When a television system of the moving image recording apparatus 1 is NTSC, in the HQ mode, a bit rate with the highest value is used, and high-resolution (horizontal×vertical resolution=720×480) and highest-quality encoding is performed. Similarly, in the SQ mode, a bit rate with the second highest value is used, and high-resolution (horizontal×vertical resolution=720×480) and second-highest-quality encoding is performed. Similarly again, in the LP mode, a bit rate with the lowest value is used, and low-resolution (horizontal×vertical resolution=352×480) encoding and high-resolution (horizontal×vertical resolution=720×480) encoding are performed when aspect ratios are 4:3 and 16:9, respectively, so as to achieve longer-time recording of a moving image on a recording medium with the same capacity as recording media used in other modes. In this case, however, the quality of the recorded moving image becomes lower than that of the recorded moving image acquired when the HQ or SQ mode is used.

In any of the recording modes, the value of the horizontal resolution may be 704 instead of 720. When a television system is PAL, the value of the vertical resolution can be 576 and 288 instead of 480 and 240 of the NTSC, respectively.

Figure 6:
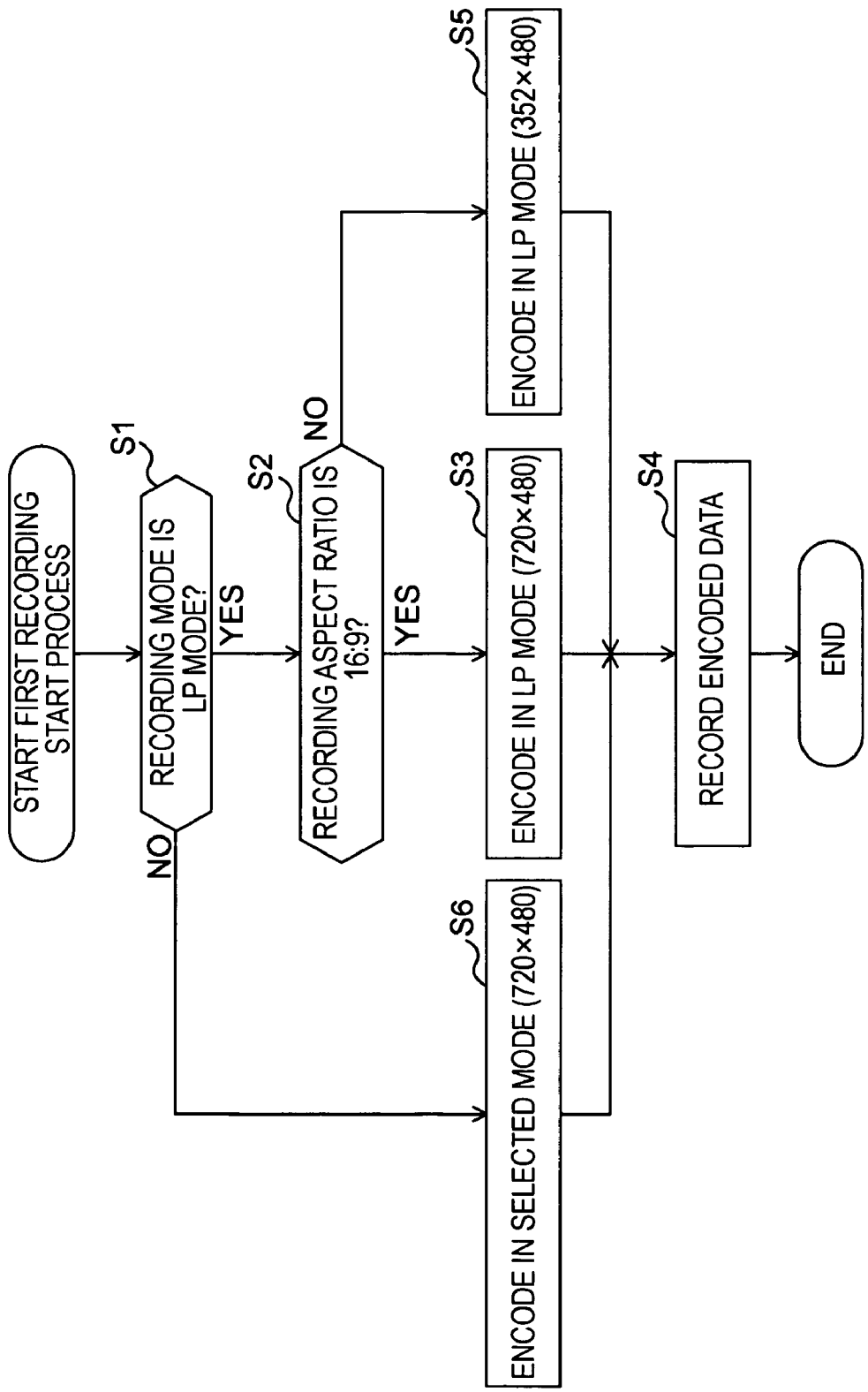
FIG. 6 is a flowchart showing a first recording start process.

Next, a first recording start process performed by the moving image recording apparatus 1 will be described with reference to a flowchart of FIG. 6. The first recording start process is performed when the moving image recording apparatus 1 adopts only the DVD-Video standard. As a premise of the process, an aspect ratio and a recording mode of an image had been selected in accordance with a selection operation performed by a user by means of the setting display 31.

In step S1, the determining unit 25 included in the control section 12 determines whether the recording mode having been selected by a user is the LP mode in accordance with the result of setting having been input from the recording mode setting unit 23. If it is determined that the recording mode is the LP mode, the process proceeds to step S2. In step S2, the determining unit 25 included in the control section 12 determines whether an aspect ratio for recording a moving image is 16:9 in accordance with the results of discrimination and setting having been input from the aspect ratio discriminating unit 21 and the aspect ratio setting unit 22, respectively. If it is determined that the aspect ratio for recording a moving image is 16:9, the process proceeds to step S3.

In step S3, the determining unit 25 outputs the determination results of steps S1 and S2 to the horizontal resolution decision unit 26. The horizontal resolution decision unit 26 sets the horizontal resolution of 720, and then informs the encoding section 15 of the horizontal resolution having been set as well as the recording mode having been selected by a user. The encoding section 15 starts an encoding operation on an image signal having been input from the image input section 14 using the LP mode (720×480) in response to the information from the horizontal resolution decision unit 26, and then outputs the encoded data acquired as a result of the encoding operation to the recording section 16.

In step S4, the recording section 16 starts to record the encoded data having been input from the encoding section 15 onto the DVD 17.

In step S2, if it is determined that the aspect ratio for recording a moving image is not 16:9 (in other words, the aspect ratio is 4:3), the process proceeds to step S5.

In step S5, the determining unit 25 outputs the determination results of steps S1 and S2 to the horizontal resolution decision unit 26. The horizontal resolution decision unit 26 sets the horizontal resolution of 352, and then informs the encoding section 15 of the horizontal resolution having been set as well as the recording mode having been selected by a user. The encoding section 15 starts an encoding operation on an image signal having been input from the image input section 14 using the LP mode (352×480) in response to the information from the horizontal resolution decision unit 26, and then starts to output the encoded data acquired as a result of the encoding operation to the recording section 16.

In step S1, if it is determined that the recording mode having been selected by a user is not the LP mode, the process proceeds to step S6. In step S6, the determining unit 25 outputs the determination result of step S1 to the horizontal resolution decision unit 26. The horizontal resolution decision unit 26 sets the horizontal resolution of 720, and then informs the encoding section 15 of the horizontal resolution having been set as well as the recording mode (the HQ or SQ mode) having been selected by a user. The encoding section 15 starts an encoding operation on an image signal having been input from the image input section 14 using the recording mode (the HQ or SQ mode) (720×480) having been selected by a user in response to the information from the horizontal resolution decision unit 26, and then starts to output the encoded data acquired as a result of the encoding operation to the recording section 16. This ends the description of the first recording start process.

As described above, according to the first recording start process, as shown in FIG. 7, when the aspect ratio is in a state that the LP mode is selected, the horizontal×vertical resolution is set to 720×480. Similarly, when the aspect ratio is 4:3 in a state that the LP mode is selected, the horizontal×vertical resolution is set to 352×480. Similarly again, when the HQ or SQ mode is selected, the horizontal×vertical resolution is set to 720×480 irrespective of the aspect ratio. Accordingly, the moving image recording apparatus 1 can encode a moving image, and then record the encoded moving image onto the DVD 17 without violating the DVD-Video standard while allowing users to arbitrarily select a recording mode and an aspect ratio. Thus, compatibility of the DVD 17 on which the encoded data has been recorded by the moving image recording apparatus 1 can be maintained.

However, in a case where an image having an aspect ratio of 16:9 is encoded at the horizontal×vertical resolution of 720×480 using the LP mode so as to be compliant with the DVD-Video standard, the quality of the image probably becomes lower than that of the image having an aspect ratio of 4:3 and having been encoded at the horizontal×vertical resolution of 352×480 using the LP mode, namely, not being compliant with the DVD-Video standard, since the amount of code per pixel is smaller.

Next, a second recording start process executed by the moving image recording apparatus 1 will be described with reference to a flowchart of FIG. 7. The second recording start process is performed when the moving image recording apparatus 1 is compliant with both the DVD-Video and DVD-VR standards. As a premise of the process, a recording format, an aspect ratio of an image, and a recording mode had been selected in accordance with the selection operation performed by a user by means of the setting display 31.

The difference between the second and first recording start processes is that the second recording start process has step S11 between steps S1 and S2 of the first recording start process. The description of the other steps having like numerals for like steps of the first recording start process will be omitted.

In step S11, the determining unit 25 determines whether the recording format having been selected by a user is the DVD-VR standard in accordance with the result of setting having been input from the format setting unit 24. If it is determined that the selected standard is the DVD-VR standard, the process proceeds to step S5. In contrast, if it is determined that the selected standard is the DVD-VR standard, the process proceeds to step S2. Since the succeeding process is similar to that of the first recording start process described above, the description thereof will be omitted.

As described above, according to the second recording start process, in a case where the DVD-Video standard is selected, like the first recording start process described above, when an aspect ratio is 16:9 in a state that the LP mode is selected, the horizontal×vertical resolution is set to 720×480. Similarly, when an aspect ratio is 4:3 in a state that the LP mode is selected, the horizontal×vertical resolution is set to 352×480. Similarly again, when the HQ or SQ mode is selected, the horizontal×vertical resolution is set to 720×480 irrespective of the aspect ratio. Accordingly, the moving image recording apparatus 1 can encode a moving image, and then record the encoded moving image onto the DVD 17 without violating the DVD-Video standard while allowing users to arbitrarily select a recording mode and an aspect ratio.

However, in a case where an image having an aspect ratio of 16:9 is encoded at the horizontal×vertical resolution of 720×480 using the LP mode so as to be compliant with the DVD-Video standard, the quality of the image probably becomes lower than that of the image having an aspect ratio of 4:3 and having been encoded at the horizontal×vertical resolution of 352×480 using the LP mode, namely, not being compliant with the DVD-Video standard, since the amount of code per pixel is smaller.

In contrast, in a case where the DVD-Video standard in which the combination of an aspect ratio and a horizontal resolution is not fixed is adopted, when the LP mode is selected, the horizontal×vertical resolution is set to 352×480 irrespective of the aspect ratio. Accordingly, the deterioration of image quality can be prevented since the amount of code per pixel does not decrease like in the case of the image being compliant with the DVD-Video standard.

According to the moving image recording apparatus 1, users' requests to record an image signal having an increasingly used aspect ratio of 16:9 for longer recording time using the low-bit-rate LP mode can be satisfied.

The present invention can be applied to not only the moving image recording apparatus 1 of this embodiment but also video cameras, video recorders, image recording programs activated on personal computers, etc.

In this specification, the steps executed in accordance with a program do not necessarily need to be performed in chronological order described above. The steps may be performed in parallel or individually.

The program may be executed by a single computer, or distributed processing may be performed on the program by a plurality of computers. Furthermore, the program may be transferred to a remote computer so as to be executed in that computer.

The invention claimed is:

1. An image recording apparatus for encoding a moving image and recording the encoded moving image in compliance with a predetermined standard, the image recording apparatus comprising:
   a processor; and
   a memory storing a set of instructions executable by the processor, the instructions comprising:

aspect ratio setting unit for setting a first or second aspect ratio as an aspect ratio for encoding a moving image to be input, in accordance with an operation performed by a user;

recording mode setting unit for setting a recording mode for encoding the moving image in accordance with an operation performed by a user, the recording mode being concerned with a bit rate and a resolution;

decision making unit for setting a first or second resolution as a resolution for encoding the moving image in accordance with a combination of the aspect ratio and the recording mode; and encoding unit for encoding the moving image at the resolution having been set by the decision making unit, wherein the decision making unit sets the first resolution as a resolution for encoding the moving image irrespective of the recording mode having been set when the aspect ratio is set to the first aspect ratio.

2. The image recording apparatus according to claim 1, wherein the decision making unit sets a horizontal resolution of 720 or 704 for encoding the moving image irrespective of the recording mode having been set in a case where the aspect ratio having been set is 16:9.

3. The image recording apparatus according to claim 1, wherein the predetermined standard is determined on the basis of information on a recording medium on which the moving image having been encoded by the encoding unit is recorded, and wherein the decision making unit sets the first or second resolution as a resolution for encoding the moving image corresponding to the recording mode having been set irrespective of the aspect ratio having been set in a case where the predetermined standard having been determined is the DVD-VR standard.

4. The image recording apparatus according to claim 1, wherein the instructions further comprise:

detecting unit for detecting an aspect ratio of a moving image having been input, wherein the decision making unit sets the first or second resolution as a resolution for encoding the moving image in accordance with a combination of the aspect ratio having been detected or set and the recording mode.

5. An image recording method of an image recording apparatus for encoding a moving image and recording the encoded moving image in compliance with a predetermined standard, the image recording apparatus including, aspect ratio setting unit for setting a first or second aspect ratio as an aspect ratio for encoding a moving image to be input, in accordance with an operation performed by a user, and recording mode setting unit for setting a recording mode for encoding the moving image in accordance with an operation performed by a user, the recording mode being concerned with a bit rate and a resolution, the image recording method comprising:

setting a first or second resolution as a resolution for encoding the moving image in accordance with a combination of the aspect ratio and the recording mode; and encoding the moving image at the resolution having been set in the decision making step, wherein the first resolution is set as a resolution for encoding the moving image irrespective of the recording mode having been set when the aspect ratio is set to the first aspect ratio.

6. A non-transitory computer-readable medium storing a program comprising instructions capable of being executed by a computer processor for controlling an image recording apparatus, the instructions comprising:

setting a first or second aspect ratio as an aspect ratio for encoding a moving image to be input, in accordance with an operation performed by a user, setting a recording mode for encoding the moving image in accordance with an operation performed by a user, the recording mode being concerned with a bit rate and a resolution, setting a first or second resolution as a resolution for encoding the moving image in accordance with a combination of the aspect ratio and the recording mode; and encoding the moving image at the resolution having been set in the decision making step, wherein the first resolution is set as a resolution for encoding the moving image irrespective of the recording mode having been set when the aspect ratio is set to the first aspect ratio.

* * * * *